United States Patent [19]

Arant

[11] Patent Number: 4,965,624
[45] Date of Patent: Oct. 23, 1990

[54] COLD CATHODE LIGHT SOURCE FOR ADDITIVE COLOR ENLARGER

[76] Inventor: Odas E. Arant, 630 Jackson Ave., Lake Worth, Fla. 33463

[21] Appl. No.: 211,256

[22] Filed: Jun. 24, 1988

[51] Int. Cl.⁵ ............................................. G03B 27/72
[52] U.S. Cl. ....................................... 355/35; 355/67; 355/70
[58] Field of Search ....................... 355/20, 32, 35, 37, 355/67, 68, 69, 70, 71, 112, 113

[56] References Cited

U.S. PATENT DOCUMENTS

| | | | |
|---|---|---|---|
| 2,438,219 | 3/1948 | Johnston | 355/37 |
| 2,447,724 | 8/1948 | Weisglass | 355/37 |
| 2,470,582 | 5/1949 | Seasongood | 116/309 |
| 3,345,509 | 10/1967 | Dauser | 355/37 |
| 3,825,335 | 7/1974 | Reynolds | 355/1 |
| 3,825,336 | 7/1974 | Reynolds | 355/1 |
| 3,897,147 | 7/1975 | Simon | 355/37 |
| 4,111,548 | 9/1978 | Pechev et al. | 355/30 |
| 4,124,292 | 11/1978 | Van Wandelen | 355/37 |
| 4,188,111 | 2/1980 | Marvin | 355/37 |
| 4,519,703 | 5/1985 | Lehman et al. | 355/69 |
| 4,640,609 | 2/1987 | Yasumoto et al. | 355/37 |
| 4,661,890 | 4/1987 | Watanabe et al. | 362/217 |
| 4,670,779 | 6/1987 | Nagano | 358/75 |

*Primary Examiner*—L. T. Hix
*Assistant Examiner*—Khanh Dang
*Attorney, Agent, or Firm*—Sybil Meloy

[57] ABSTRACT

A light source device for a color enlarger, in which at least six planar light sources are used, two each to serve as a red light source, a green light source, and a blue light source, respectively, are disclosed. In the device, the planar light source serving as a red light source are two cold cathode red light grids arranged perpendicular to an optical axis of the work. The other four grids, two serving as green and two serving as blue light sources, respectively, are arranged in stacked, substantially parallel and horizontal relationship with the red light grids, with one green light grid adjacent the two red light grids, and the remaining blue and green grids alternating thereupon.

11 Claims, 5 Drawing Sheets

COLD CATHODE LIGHT SOURCE FOR ADDITIVE COLOR ENLARGER

BACKGROUND OF THE INVENTION

The present invention relates to the field of photography and, more particularly, to a cold cathode discharge light source for use in photographic enlargers or printers.

The production of color photographs involves the use of a source of light. The source of light has to be adjusted to vary the color balance. One method for variation of the color balance is to use a "white" light source and vary balance by the use of subtractive yellow, cyan and magenta filters between the light source and the negative. An alternate method for color balancing a light source is the additive system wherein individual sources of red, green and blue light are combined or additively mixed to produce "white" light. The advantage of this alternative method is that the color of the composite light may be continuously varied over a wide range by varying amounts of the three primary colors being used to illuminate the printing plane. For example, the intensity of each of the three sources may be adjusted to vary the composite color.

A major problem associated with the prior art additive light systems is the lack of efficiency in terms of light utilization. Generally, the inefficiency occurs at the point where the three primary colors are mixed or combined.

Some mixing systems use a frosted glass plate as a diffuser coupled with other reflective devices to mix the red, green and blue light. Other systems employ an integrating sphere or dome for combining the light by multiple internal reflections. U.S. Pat. No. 3,120,721 uses a "light integrating bar" for combining the three primary colors. U.S. Pat. No. 3,825,336 uses a variable color light source featuring a fibre optic light mixing device for receiving different colored light. U.S. Pat. No. 4,124,292 uses a plurality of different individual lamps associated with mirrors which selectively reflect the lamp with which it is associated, the reflected light being then filtered and passed into a color-mixing chamber to provide a light of the predetermined color composition. The mixing chamber concept is also presented in U.S. Pat. No. 4,188,111. U.S. Pat. No. 4,111,548 involves a rotating reflecting device followed by mixing of the beams. U.S. Pat. No. 3,345,509 discloses a radial arrangement of the light sources around a central axis and focused at a central point, there being at least two source of light for each primary color. U.S. Pat. No. 4,640,609 arranges the red light source and the blue and green light sources in parallel or opposed directions.

Three cold cathode tubes have been used as grids in layers, one on top of the other, of green and blue light for black and white enlargers. The latter is not suitable as a light source for a color enlarger. The inventor has tested a five layer arrangement of red, two blue and two green grids, but a practical device did not result.

Because of the relatively low efficiency of mixing devices as light transmitters, in order to provide adequate light levels at the negative for short exposure times, high wattage lamps must be employed in the mixing devices. This in turn causes excessive heat to be generated within the lighting system. The heating problem either limits the size of the lamps that can be used, thereby extending exposure time, or requires that complex heat reducing or cooling aids be built into the system.

SUMMARY OF THE INVENTION

The present invention provides a variable intensity color light source device for use with a photographic printer or enlarger, without the need for color filters.

In a preferred embodiment, the light source comprises at least two individual sources each red, green and blue light in the form of stacked grids of cold cathode discharge tubes contained in a reflective housing and means for individually varying the intensity of these primary color light sources.

The mixing of these light sources occurs by reason of the arrangement of the cathode tubes with respect to each other within the reflective housing, without the need for sophisticated mixing devices or filters. Specifically, the cathode tubes of the various colors in the form of grids preferably composed of undulating tubes, are positioned in stacked horizontal relationship to each other in the reflective housing for the grids. The grid housing can be contained in a housing for the light source device. The device housing includes a lower plate having an opening therein in communication with the work, namely, the positive or negative and paper or film, and an upper head.

The two red grids are positioned most nearly proximate to the opening in the lower plate and in horizontal relationship therewith. The two green and the two blue cathode tubes are arranged respectively and alternatively in horizontal relationship to said red grids and extend in spaced relationship thereto toward the upper head of the light source device. Each stacked grid is offset from the adjacent grid by the maximum amount possible within the space confines, at a minimum angle of plus or minus 10°, preferably by an angle of roughly plus or minus 45°, measured from the center of each adjacent tube and the horizontal plane of the grid.

It is an object of this invention to provide a system for additive light mixing which is simple, which minimizes variations in illumination and which minimizes losses in efficiency and excessive heating.

Another object of this invention is the provision of and light source for an enlarger useable for color or black and white film and for tungsten film exposed in daylight, and daylight film exposed in tungsten light.

According to the device of this invention, the mixing of the different colored light beams is accomplished by the use of a reflective housing containing six stacked grids of cold cathode light sources, with the red grids being closer to the work, film or paper to be developed, and the green and blue grids stacked therefrom in alternating and offset relationship. This stacked grid arrangement results in an inherent mixing of the red, green and blue light sources without the need for a separate mixing drum or other additional step to cause the mixing of the red, green and blue lights.

The second red grid of the device having more than three grids is critical, since an attempt to produce a desirable color print with a similar device, but having only one red grid, did not result in a practical device. That five grid device resulted in prints lacking proper color balance, being difficult to control with respect to color and intensity, and having too long an exposure time.

The grids of different colors are aligned so that the tubes are offset from the underlying tube and thus are so placed to produce illumination across an exposed plane with no substantial variation in candlepower. Means are provided so that the intensity of illumination of each of the grids can be separately controlled. The variation may be achieved manually for any individual lamp or with a suitable integrated system which may be adapted for a remote control, or automatic control through circuit arrangements. In addition, means are provided to minimize the build-up of heat in the enlarger.

DETAILED DESCRIPTION OF THE PREFERRED EMBODIMENT

Figure 1:
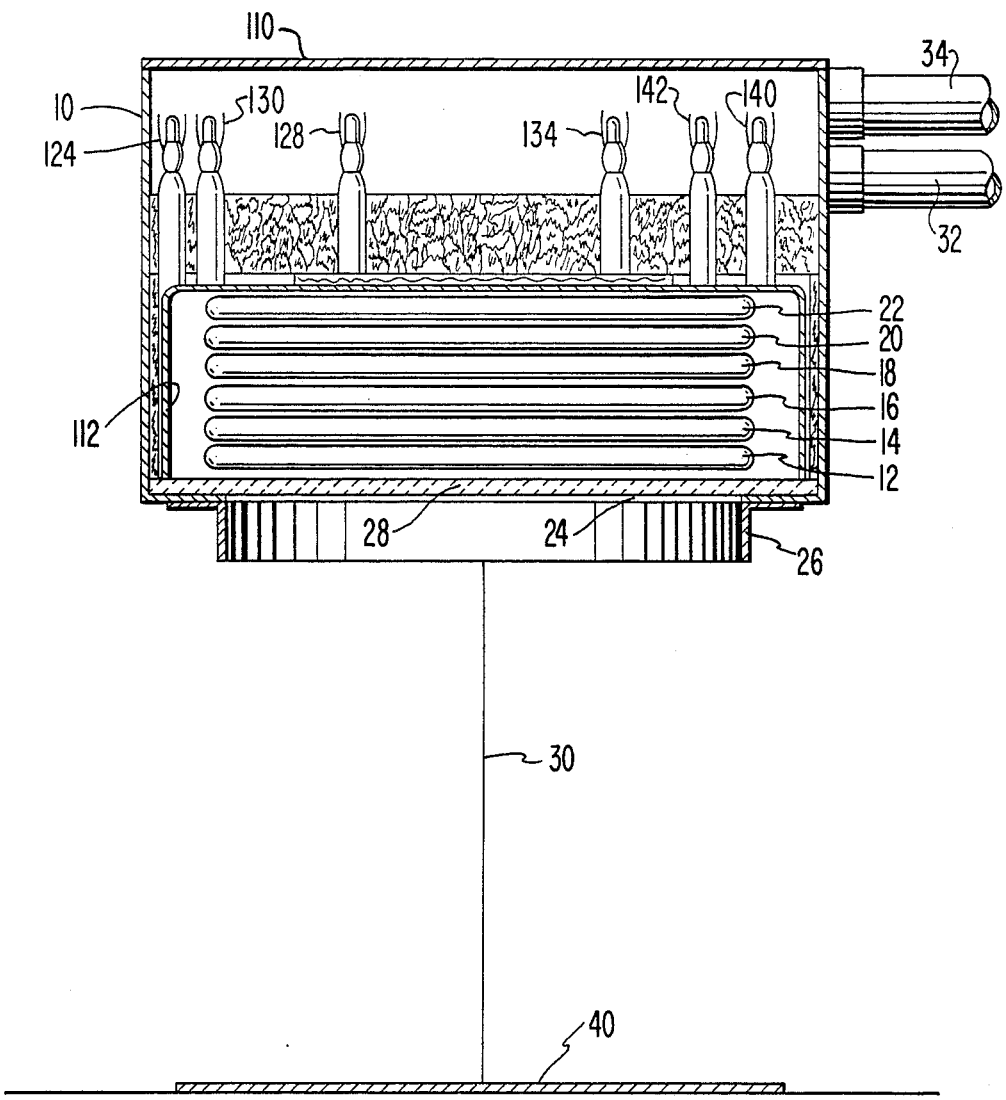
FIG. 1 is a cross-sectional view of the light source device of the color enlarger.

With reference to FIG. 1, showing a cross section of the optical system of a color enlarger light source according to this invention, enlarger head housing 10 contains a series of stacked cold cathode discharge tubes 12, 14, 16, 18, 20 and 22 lying above an opening 24 in the enlarger enclosed by reflective grid housing 112. The grids are in horizontal and adjacent relationship to each other. Opening 24 is surrounded by an enlarger adaptor ring 26.

The light source for the color enlarger comprises two red cold cathode discharge tubes 12 and 14, two green light cold cathode discharge tubes 16 and 20, and two blue light cold cathode discharge tubes 18 and 22. Together, the cold cathode discharge tubes function as the lighting source for the color enlarger which has an axis 30 perpendicular to said cold cathode discharge tubes 12, 14, 16, 18, 20 and 22, and which axis terminates in a work area 40 which contain the film or paper to be exposed. The axis 30 is perpendicular to the work area 40. Diffusion glass 28 can be used to diffuse the light emitted. Grid housing 112 is constructed of a reflecting material, such as aluminum, or has a reflecting material on its internal surface. The grid housing contains apertures not shown for the electrode containing ends of the tubes 12, 14, 16, 18, 20 and 22, several of which are shown in FIG. 1 as 124, 130, 128, 134, 140 and 142. The grid housing 112 can be surrounded on the exterior thereof with an insulating material to minimize heat transfer to the interior of grid housing 112.

Figure 2:
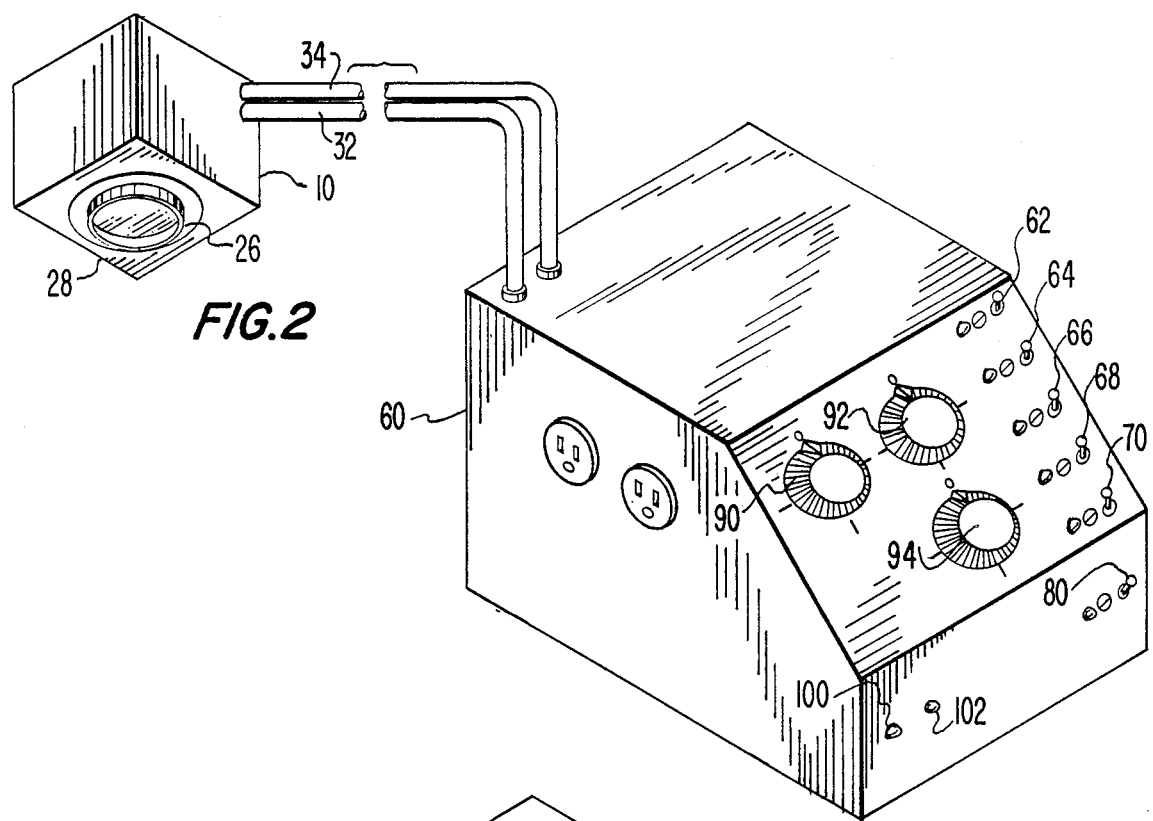
FIG. 2 is a plane view showing the light source device and control.

FIG. 2 illustrates the relationship between the enlarger head housing 10 and the control console 60. As seen in FIG. 2, showing the light source enlarger head housing 10, adapter ring 26 and diffusion glass 28, emerging from housing 10 are the power lines 32 for the various sensors and stabilization and the secondary power lines 34 for the grids. The power lines 32 and 34 are connected to a console 60 used to control the lighting. The console 60 contains a series of indicator lights 62, 64, 66, 68 and 70 which indicate which grids will illuminate when the timer shown on FIG. 6 as "T" engages current to the grids. Dials 90, 92 and 94 serve to control the intensity of the green light, blue light and red light. The dials 90, 92, and 94 serve as reostats to control the amount of electricity which is furnished the various transformers coupled to the cold cathode tubes, and, thus, the intensity of the light produced. Stabilizer indicators 100 and 102 indicate when the temperature of the grid housing is uniform and thus the device is ready for use.

The color enlarger head is activated by turning on main switch 80, in communication with the main power line, followed by opening the appropriate on/off color switches 62, 64, 66, 68 and 70. Each of the tubes, red tubes 12 and 14 are connected to color switch 70 and tubes 16, 18, 20 and 22 to switches 68, 64, 66 and 62 respectively.

Figure 3:
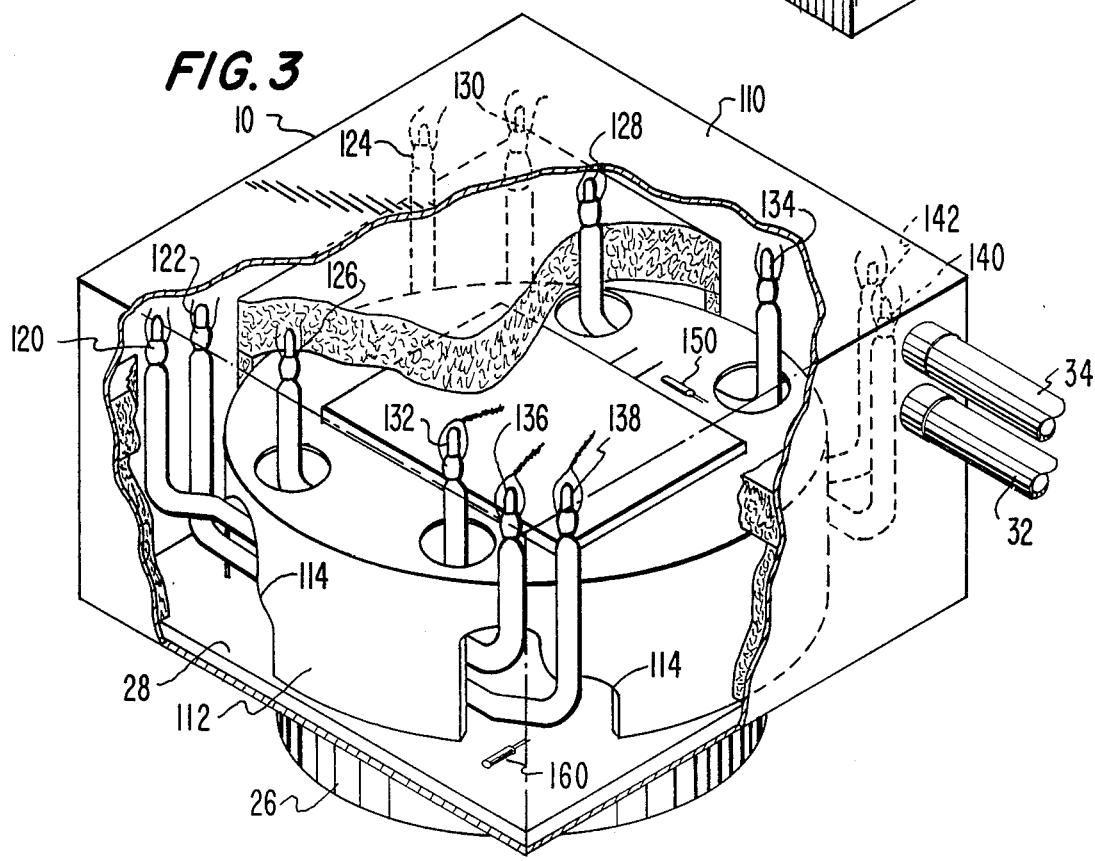
FIG. 3 is a perspective view of the light source device with one wall cut away showing the cold cathode discharge tubes and the housing therefor.

FIG. 3 is a perspective view of the color enlarger head housing 10 cut away to show the interior. Power lines 32 and 34 lead to the console 60 shown in FIG. 2. The enlarger head housing 10 has a lower diffusion glass 28 in opening 24 and an opposed enlarger head plate 110. The enlarger head housing 10 contains a grid housing 112 which houses the cold cathode discharge tubes 12, 14, 16, 18, 20 and 22. The grid housing 112 should be insulated on the exterior to limit the heat transfer from the electrode-containing end portions of the cold cathode tubes 120, 122, 124, 126, 128, 130, 132, 134, 136, 138, 140 and 142 to the interior of the grid housing. This can be accomplished by applying an insulating material around the outside of housing 112.

Electrode-containing end portions 120, 122, 124, 126, 128, 130, 132, 134, 136, 138, 140 and 142 form part of the cold cathode tubes 12, 14, 16, 18, 20 and 22, and function in cooperation with the individual power lines connected to the electrodes (not shown), and to the console 60 (not shown) to permit the variation in electrical current to each of the cold cathode tubes, individually. Preferably a 30 milliampere power supply is used to minimize temperature elevation.

Enlarger adapter ring 26 surrounds the diffusion glass 28 shown in FIG. 2.

Enlarger head housing 10 also includes a heat sensor 150, as well as a light sensor 160 which can be used in connection with known structures for indicating the level of heat and light given off by the system. The level of heat and light is indicated via connections not shown on indicators 100 and 102 on the control panel.

Figure 4C:
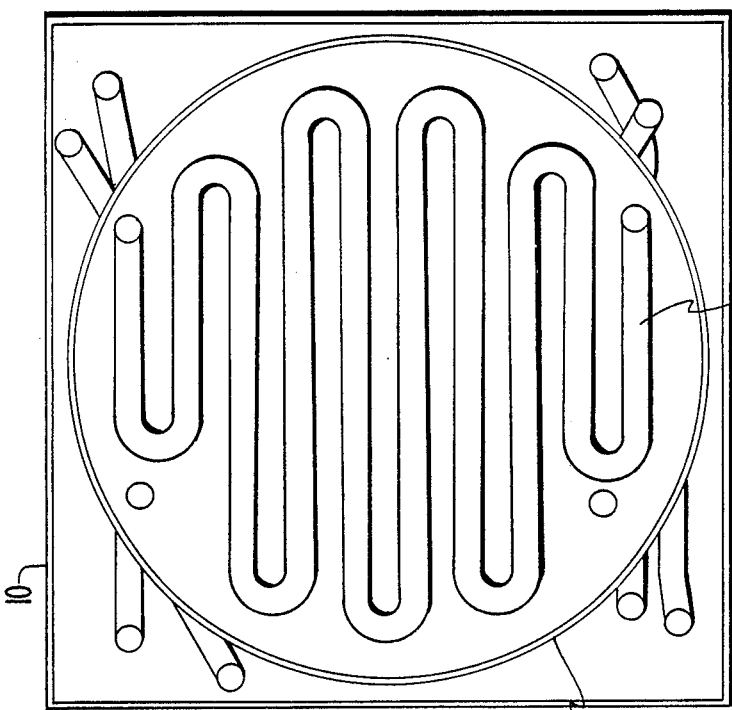
FIG. 4 is shows exploded portions of the light source device, FIG. 4A showing the light source device housing, FIG. 4B the reflective, cold cathode discharge tube housing, and FIG. 4C, which is a top view of the color cathode discharge tube housing, showing a grid of a color tube having an undulating shape.
Figure 4B:
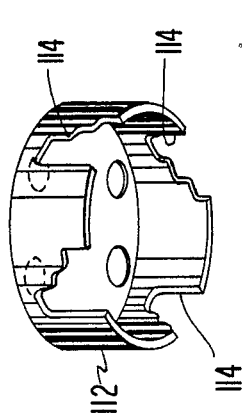
Figure 4A:
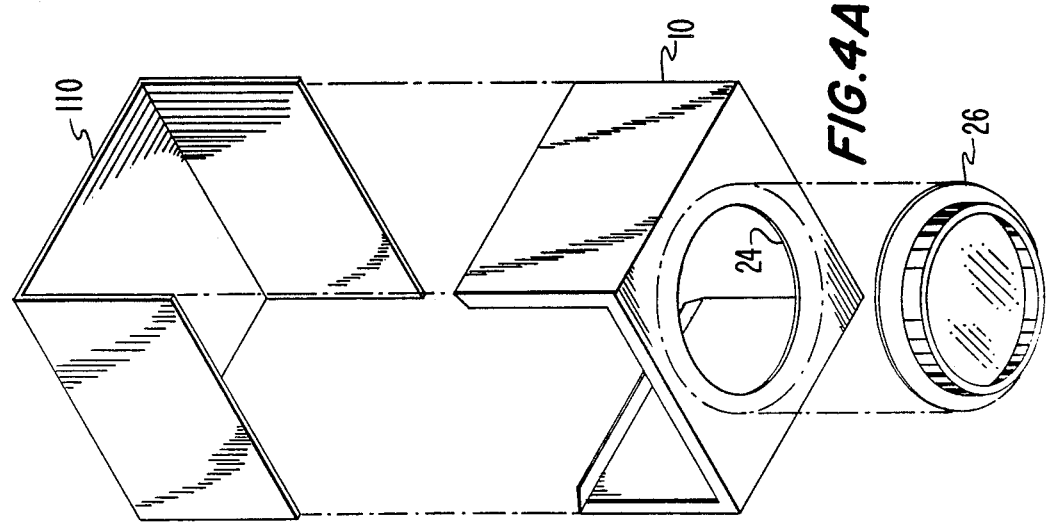

FIG. 4A illustrates an exploded section of the enlarger head housing 10. Specifically, an aluminum enclosure is prepared with one wall section of the box being cut out in a circular pattern to form the opening 24. The aluminum box is suitably nine inches in width by nine inches in length by approximately six inches in height.

Into the aluminum box is placed the cold cathode grid housing 112 of FIG. 4B which is a circular shaped aluminum housing of approximately 8κ inches in diameter and three inches in height. Into the aluminum housing are placed the grids of the cold cathode tubes, the electrodes of which are connected to the power source. Portions 114 of the grid housing 112 permit exit of the cathode end portions 120, 122, 124, 126, 128, 130, 132, 134, 136, 138, 140 and 142.

FIG. 4C shows a convenient undulating shape of any of the grids 12, 14, 16, 18, 20 or 22. Cold cathode tubes are available commercially as "neon tubing" in the form desired. The undulating shape of the grid is particularly adapted to diffusion of the light source, however, other shapes are equally suitable. The glass for the wall of the tube should be of uniform thickness and circumference to minimize localized elevation of temperatures.

Figure 5A:
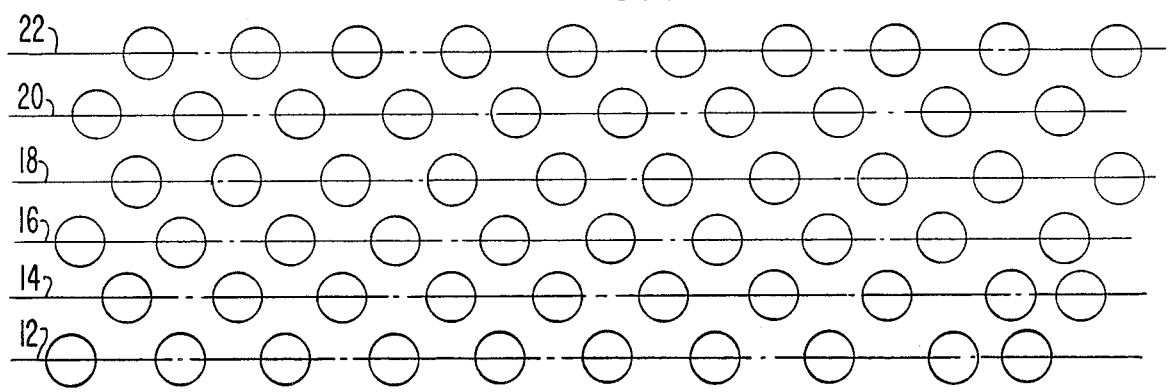
FIG. 5A and FIG. 5B are side sections taken through the stacked grid arrangement of the enlarger, showing the horizontal relationship of the grids, as well as the placement of one grid group relative to the other.
Figure 5B:
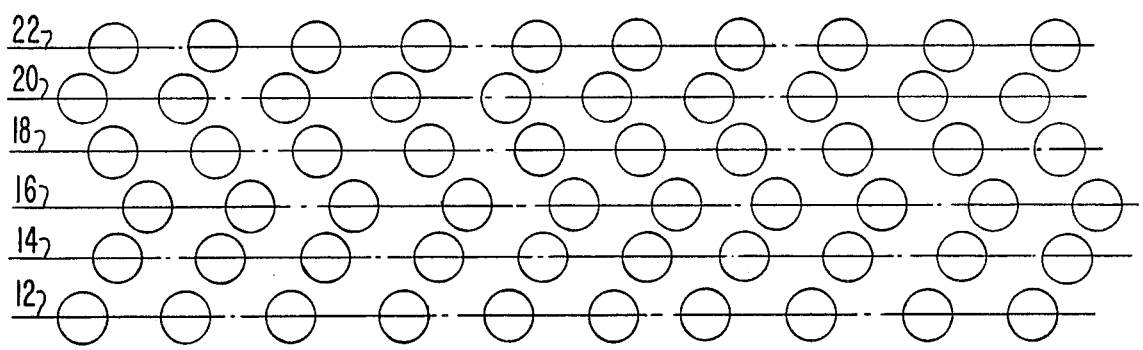

FIGS. 5A and 5B illustrate a preferred alignment of the different grids. Basically, the grids are positioned adjacent the diffusion head in stacked relationship in the following order beginning with the grid opening 24: red, red, green, blue, green, blue. Preferably the individual grids are aligned such that the series of individual tubes from each grid are offset from adjacent grid at an angle. Any angle can be used, however, the individual grids preferably form an angle of at least plus or minus 10° and preferably approximately plus or minus 45° from the center point to center point of one tube to the adjacent tube of the underlying grid with reference to the horizontal plane of the tube. The purpose of offsetting one grid from the other is to permit as much as possible of the light emitted to travel toward the work area 40 without being reflected and thus diminished in intensity.

FIG. 5A shows a particularly preferred arrangement of grids, with the first red grid 14 set at a plus 45° angle from the center point to the center point of one tube to the tube of the adjacent grid, with the next grid being offset at a minus 45° angle, measured from the plane of the grid to the center point of the outermost tube of the adjacent grid. FIG. 5B shows another arrangement of the grids with the angles of the first three grids being positive 45°, the angle of the next two grids being negative 45° with reference to the adjacent grid, and the angle of the final grid being plus 45° with reference to the adjacent grid.

Figure 6:
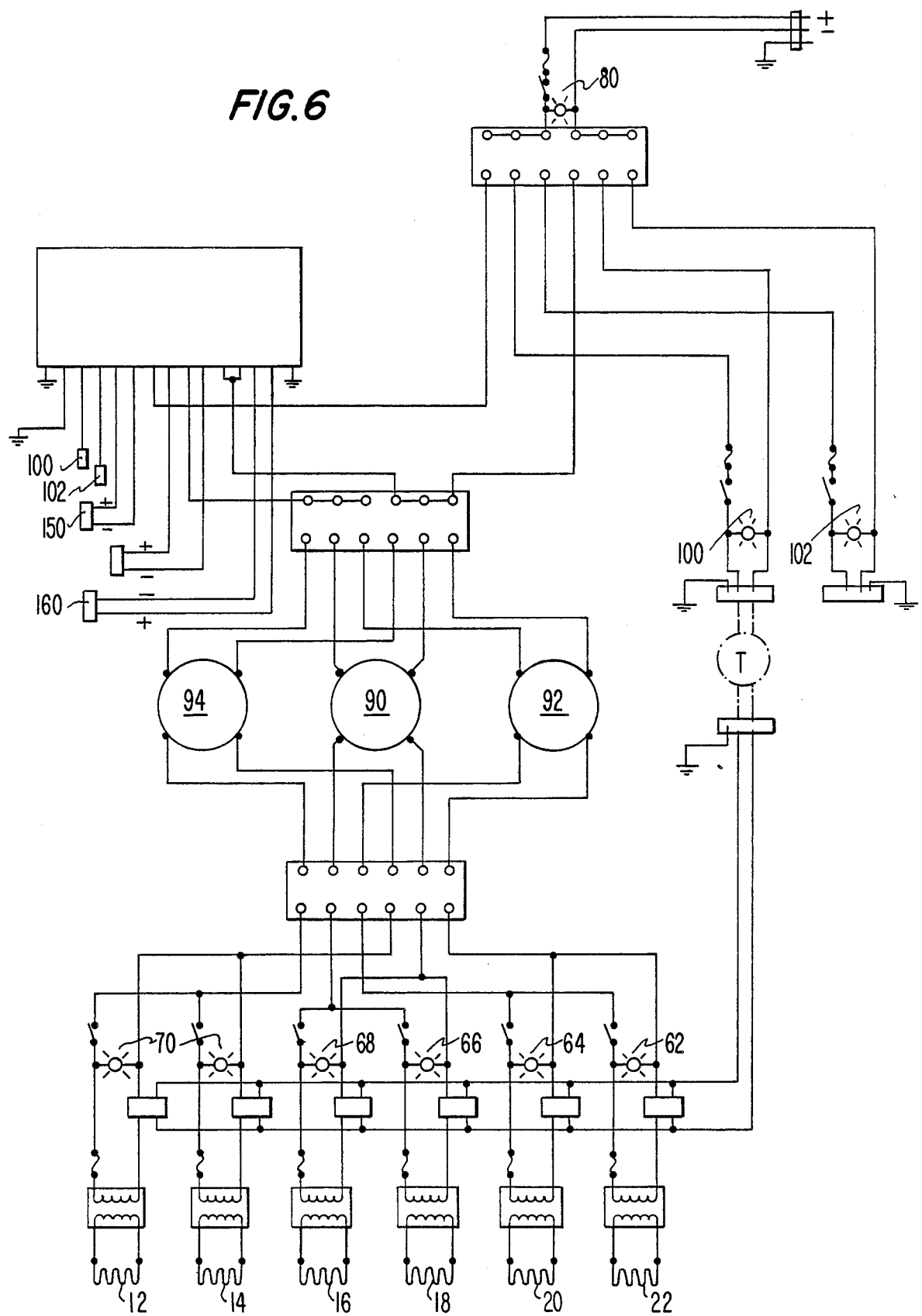
FIG. 6 is a schematic diagram illustrating the wiring of the invention.

FIG. 6 is schematic diagram in illustrating the electrical circuitry of the invention. Electrodes from each of grids 12, 14, 16, 18, 20 and 22 lead to individual circuits, and each individual circuit includes a transformer and fuse. The individual circuits are connected to on/off color switches 62, 64, 66, 68 and 70, with both red grids being connected to switch 70, and tubes, 16, 18, 20 and 22 being connected, respectively, to switches 68, 64, 66 and 62. The intensity of the current in the grids is controlled by reostats 90, 92 and 94. Further control is achieved in the circuits via stabilizer indicators 100 and 102 in communication with heat and light sensor controls 150 and 160.

The color enlarger of this invention is used as follows.

Main switch 80 is activated. Red grid switch 70 is activated, and red variation dial 94 is set to 90% of full intensity. Weak green grid switch 68 is turned on and the green variation dial 90 is set to 20% of full intensity. Weak blue grid switch 64 is turned on, and the blue grid variation dial is set to 20% of full intensity. The operator waits for the green stabilization light 102 to activate. A test wedge of paper is exposed and developed and then desired changes are made.

As an alternative to the foregoing two red, one green and one blue tube can be used. Also, as an alternative to the foregoing, a device for use only with color printing can employ a device identical to the above but with only one green, one blue and red grid. A device for use only with black and white printing can employ only two green and two blue grids.

The embodiments described herein are preferred embodiments. However, it is contemplated that further variations and modifications within the purview of those skilled in the art can be made. The following claims are intended to cover all such variations and modifications as fall within the spirit and scope of this application.

What is claimed is:

1. A light source device for a color enlarger or printer which includes an enlarger head housing having a lower opening and an opposed head and means for directing light toward an area through the lower opening, comprising:

means for emitting red light toward said area, said red light emitting means comprising at least two cold cathode discharge tubes in the form of first and second red grids, said red grids being located substantially proximate to and horizontal with the lower opening in the enlarger head housing, each of said red grids being adjacent to the other red grid;

means for emitting blue light toward said area, said blue light emitting means comprising at least two blue light cold cathode discharge tubes in the form of first and second blue grids;

means for emitting green light towards said area, said green light emitting means comprising at least two green light cold cathode discharge tubes in the form of first and second green grids, said blue grids and said green grids being arranged horizontal to said lower opening in the housing, with the first green grid positioned adjacent the second red grid and the second green grid and the first and second blue grids being positioned in alternate horizontal relationship to each other;

a reflective grid housing; and means for varying the intensity of the light emitted by each of the grids.

2. The invention of claim 1, further comprising means for diffusing the light emitted from said light source device.

3. The invention of claim 2, in which said red, blue and green rids are in undulating form.

4. The invention of claim 3, in which each grid is offset from the adjacent grid tube by an angle which alternates from grid to grid from about plus 45° to minus 45°.

5. The invention of claim 1, wherein the device includes sensors within the enlarger head housing for the cold cathode tube to indicate the amount of heat and light emitted therein within a predetermined range.

6. The invention of claim 1, in which each cold cathode discharge tube is offset from the underlying tube by an angle which alternates from grid to grid, from plus 45° to minus 45°, and the device includes sensors within said enlarger head housing to indicate and regulate the amount of heat and light emitted therein within a predetermined range.

7. The invention of claim 1, further comprising means for diffusing the light emitted from said light source device and wherein said device includes sensors within the said enlarger head housing to indicate the amount of heat and light emitted, and in which each grid is offset from the adjacent grid by an angle which alternates from grid to gird, from about plus 45° to minus 45°.

8. The invention of claim 1, further comprising means for insulating said enlarger head housing to limit the heat transfer therefrom.

9. The invention of claim 8, in which the electrodes of the discharge tubes are positioned outside the reflective grid housing.

10. A light source device for a color enlarger or printer which includes an enlarger head housing having a lower opening and an opposed head and means for directing light toward an area through the lower opening, comprising:

means for emitting red light toward said area, said red light emitting means comprising at least two cold cathode discharge tubes in the form of first and second red grids, said red grids being located substantially proximate to and horizontal with the lower opening in the enlarger head housing, each of said red grids being in adjacent relationship to the other red grid;

means for emitting blue light toward said area, said blue light emitting means comprising at least two blue light cold cathode discharge tubes in the form of first and second blue grids;

means for emitting green light towards said area, said green light emitting means comprising at least two green light cold cathode discharge tubes in the form of first and second green grids, said blue grids and said green grids being arranged horizontal to said lower opening in the housing, with the first green grid positioned adjacent the second red grid and the second green grid and the first and second blue grids being positioned in alternate horizontal relationship to each other, each of said red, blue and green grids being offset from the immediately adjacent underlying grid by an angle of roughly plus or minus 45°;

a reflective grid housing;

means for varying the intensity of the light emitted by each of the grids; and means for varying the amount of heat built up within the device.

11. A light source device for a photographic enlarger comprising a plurality of at least three cold cathode discharge tubes emitting red, green and blue light in the form of grids and having at least two red tubes if the number of tubes is greater than three, said grids being in stacked, horizontal relationship to each other, and enclosed within a reflective housing therefor, the electrodes for said cold cathode discharge tubes being positioned outside the housing for the grids.

* * * * *